Jan. 11, 1955  A. W. KLOMP  2,698,988
TOOL FOR GENERATING GEARS
Filed June 11, 1952
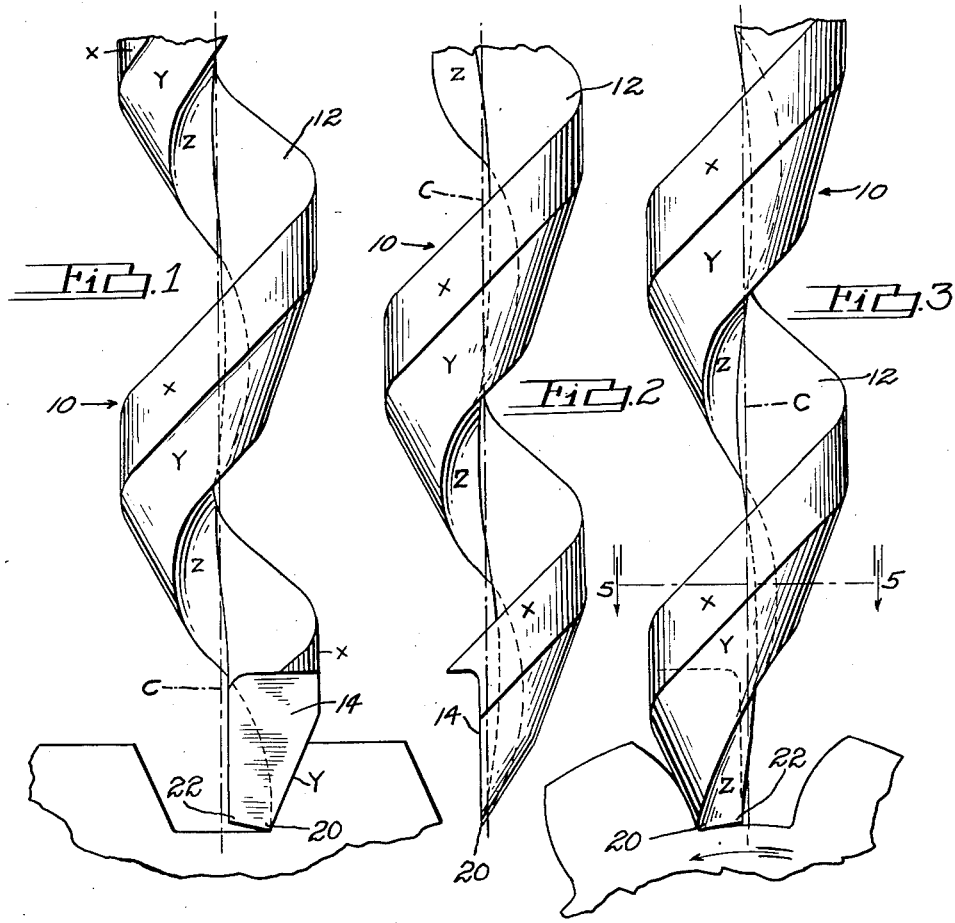
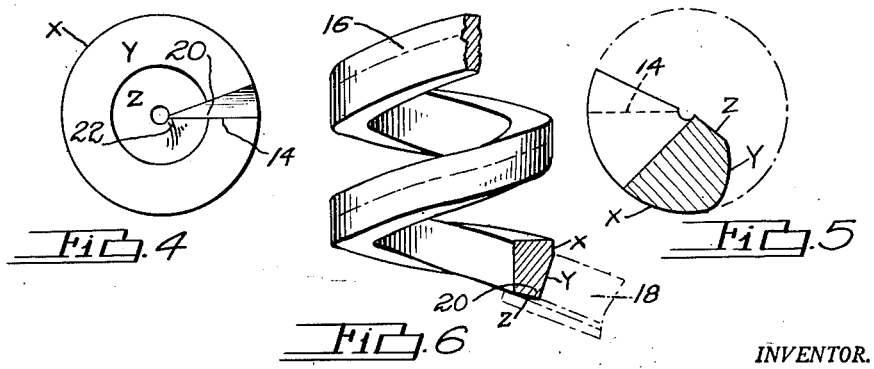
INVENTOR.
ALFRED W. KLOMP
BY
HIS ATTORNEY

United States Patent Office 2,698,988
Patented Jan. 11, 1955

2,698,988

TOOL FOR GENERATING GEARS

Alfred W. Klomp, Detroit, Mich.

Application June 11, 1952, Serial No. 292,948

5 Claims. (Cl. 29—103)

This invention relates to a cutting tool and more particularly to a tool somewhat resembling the appearance of a twist drill but constructed to perform the cutting operation by rotation of the tool about its longitudinal axis and by movement of the tool radially with respect to its longitudinal axis.

An object of the invention is to provide a tool having a truncated conic section cutting face ascending in a helix about the axis of the tool and capable of retaining its form and dimension when ground back along the helical shank for sharpening the cutting faces.

Another object of the invention is to form the shank such that one grinding operation sharpens a plurality of cutting edges, provides the necessary back off, and permits the tool to be sharpened throughout the entire length of the helical shank.

A further object of the invention is to form the tool having a plurality of ascending helical faces in each convolution of the helix.

Other objects and advantages of the invention will more fully appear from the following description taken in connection with the accompanying drawings, in which:

Fig. 1 is a side elevational view of the cutting tool showing the formation of a rack gear tooth;

Fig. 2 is a view showing the tool in side elevation as viewed at 90 degrees to Fig. 1;

Fig. 3 is a side elevational view of the tool as viewed at 180 degrees to Fig. 1, showing the formation of an involute gear tooth;

Fig. 4 is a bottom end elevational view of Fig. 1;

Fig. 5 is a cross sectional view taken on line 5—5 of Fig. 3; and

Fig. 6 is a side elevational view of a coil spring, parts being broken away and in section, illustrating the method of forming the faces Y and Z on the tool shown in Fig. 1.

Referring to the drawings, I have shown my improved tool as having a body portion 10 provided with a helical shank portion 12 and a cutting face portion 14. The main portion of the body is formed with a plurality of ascending helical faces, herein shown as a land face X, a conical face Y, and a back off face Z. The land X is the cylindrical portion of the tool and lies in a plane parallel to and concentric with the axis of the tool. The conical face Y is formed having an angle corresponding to the desired pressure angle of the side face cut in the work, and the back off face Z has an angle or shape corresponding to the desired back off at the cutting end face of the tool.

As one example of the use of the tool, I have selected the operation of generating gear teeth from a blank, wherein the gear tooth is formed by the rotation of the tool about its own axis, the movement of the tool axis across the outer surface of the blank, and the feeding of the tool axially of its length into the blank.

The cutting face Y of the tool is of conic section in shape and is formed on an angle with respect to the axis of the tool equal to the desired pressure angle of the tooth face when rack teeth are being cut, as shown in Fig. 1. This same cutting face Y may be used for cutting involute gear teeth when the gear blank is rotated about its own axis during the cutting operation as shown in Fig. 3. The spiral conical face Y extends from the outer edge at the bottom side of the spiral land X toward the center of the tool and terminates at the back off face Z.

The back off face Z extends from the lower edge of the conical face Y to a point short of the axial center line of the tool, indicated by the dot and dash line C in Figs. 1, 2 and 3, and is formed in a spiral plane greater than 90 degrees to a radial line through the axis of the tool.

Each angle of both faces Y and Z or the shape thereof may be varied to give the desired angle or shape. Variations in the angle of the face Y varies the pressure angle of the gear tooth side face or the side wall of a groove when the tool is used for cutting slots, splines, or the like. Variations in the angle of the face Z determines the amount of back off and the extent of the end cutting surface of the tool.

To more clearly understand the construction of the tool, reference is made to Fig. 6 of the drawing wherein a helical spring 16 is used to illustrate, in exaggerated form, the location and formation of the faces Y and Z. Assuming that the spring 16 is rectangular in cross section and that the outer lower corner of the helix is cut away by a tool or grinding wheel having cutting faces at substantially right angles to each other, as indicated by a tool 18 shown in dot and dash lines, the faces Y and Z are formed similar to the faces Y and Z in Figs. 1, 2 and 3.

The sharpening of the tool is done by passing a tool such as a grinding wheel or honing device across the end of the tool substantially in a plane parallel to the axis of the tool and on a radial line forming the face 14. This produces the cutting edge at the side of the conical face Y and the cutting edge at the face Z. The angle of the cutting face of the grinding wheel may be varied as well as the path through which the grinding wheel may be varied as well as the path through which the grinding wheel passes, the face 14 may be varied as desired to give the best cutting operation for the material being cut; that is, to provide for either a hook or rake type cut.

From the above it will be seen that the tool may be sharpened throughout its length by a single pass of a grinding wheel across the face 14 and that both cutting edges of faces Y and Z are sharpened simultaneously.

The cutting face portion 14, when sharpened, is formed with a toe 20 at the intersection of the faces Y and Z, which is a leading cutting edge of the tool, and a heel 22 which is the back off portion.

While the invention has been illustrated and described in its preferred embodiment, it will be understood that the size and shape of the tool may be varied, the helical angle may be varied, and the angular faces, as well as their shape, of the faces Y and Z, and the face 14, may be varied without departing from the spirit of the invention and it is not my intention to limit its scope other than by the terms of the appended claims.

I claim:

1. A gear generating tool adapted to be rotated about its longitudinal axis including, a helical land face, a helical conical face extending from the outer lower edge at one side of the helical land face toward the center of the tool, a helical back off face extending from the inner edge of said conical face toward the axis of the tool and terminating short of the tool axis, and a cutting face substantially in a plane extending parallel to the tool axis and intersecting said helical land face, said conical face and said back off face.

2. A gear generating tool adapted to be rotated about its longitudinal axis including, a helical conical face extending from the outer diameter of the tool toward the tool axis, a helical back off face extending from the inner edge of said conical face substantially at right angles to the plane of said conical face toward the tool axis and terminating short of the tool axis, and a cutting face substantially in a plane extending parallel to the tool axis and intersecting said conical face and said back off face.

3. A generating tool adapted to be rotated about its longitudinal axis including, a helical land face in a plane substantially parallel to the axis of the tool, a conical helical face extending from the outer lower edge of said helical land face toward the axis of the tool, a helical back off face extending from the inner edge of said conical face toward the axis of the tool and terminating short of the tool axis, and a sharpened surface at the end of the tool extending in a plane radially and longitudinally with respect to the axis of the tool forming a cutting edge at the end of the tool and the conical face, the end of the tool formed by the helical back off face and the sharpened surface being on a line greater than 90 degrees to a radial line through the axis of the tool.

4. A gear generating tool adapted to be rotated about its longitudinal axis including, a helical land face in a plane substantially parallel to the axis of the tool, a helical conical face forming a continuation of said land face and extending toward the tool axis, and a helical back off face forming a continuation of said conical face and extending toward the tool axis, said helical faces terminating short of the tool axis, and a sharpened side face intersecting said helical faces forming cutting edges in said conical and said back off faces.

5. A gear generating tool adapted to be rotated about its longitudinal axis including, a helical conical face extending from the outer diameter of the tool toward the tool axis, a helical back off face forming a continuation of said conical face and extending toward the tool axis at a greater angle than said conical face, said helical faces terminating short of the tool axis, and a sharpened side face intersecting said helical faces forming cutting edges in said conical and said back off faces.

References Cited in the file of this patent

UNITED STATES PATENTS

| | | |
|---|---|---|
| 2,556,745 | Zimmerman | June 12, 1951 |
| 2,620,549 | Klomp | Dec. 9, 1952 |

FOREIGN PATENTS

| | | |
|---|---|---|
| 194,725 | France | Dec. 12, 1888 |